US008051155B2

(12) United States Patent
Claise (10) Patent No.: US 8,051,155 B2
(45) Date of Patent: Nov. 1, 2011

(54) METHOD AND APPARATUS FOR PERSISTING SNMP VARIABLE VALUES

(75) Inventor: Benoit Claise, Crisnee (BE)

(73) Assignee: Cisco Technology, Inc., San Jose, CA (US)

( * ) Notice: Subject to any disclaimer, the term of this patent is extended or adjusted under 35 U.S.C. 154(b) by 1107 days.

(21) Appl. No.: 11/215,965

(22) Filed: Aug. 30, 2005

(65) Prior Publication Data

US 2007/0050498 A1    Mar. 1, 2007

(51) Int. Cl.
G06F 15/173 (2006.01)
(52) U.S. Cl. ........................................................ 709/223
(58) Field of Classification Search .......... 709/222–223; 717/108
See application file for complete search history.

(56) References Cited

U.S. PATENT DOCUMENTS

| | | | | |
|---|---|---|---|---|
| 5,613,099 | A * | 3/1997 | Erickson et al. | 719/315 |
| 2001/0032300 | A1* | 10/2001 | Olson | 711/162 |
| 2002/0129094 | A1* | 9/2002 | Reisman | 709/203 |
| 2003/0005223 | A1* | 1/2003 | Coulson et al. | 711/118 |
| 2003/0140273 | A1* | 7/2003 | Kamalvanshi et al. | 714/13 |
| 2004/0160464 | A1* | 8/2004 | Reyna | 345/854 |
| 2004/0204778 | A1* | 10/2004 | Lalapeth et al. | 700/83 |
| 2005/0278709 | A1* | 12/2005 | Sridhar et al. | 717/136 |
| 2007/0002767 | A1* | 1/2007 | Holman et al. | 370/255 |

OTHER PUBLICATIONS

Case, J. et al., "A Simple Network Management Protocol (SNMP)," Network Working Group, RFC 1157, May 1990, 33 pages.
Cisco, "Interface Index Persistence—Table of Contents," Updated Oct. 20, 2005, Document ID: 28420, 6 pages.
Cisco, "Interface Index Display and Interface Alias Long Name Support for SNMP," Cisco IOS Release 12.2(2)T, first published Jun. 7, 2001, last updated May 28, 2002, pp. 1-18.
Kavasseri, R., "Distributed Management Expression MIB," Network Working Group, RFC 2982, Oct. 2000, 37 pages.
Kavasseri, R., "Notification Log MIB," Network Working Group, RFC 3014, Nov. 2000, 24 pages.
Kavasseri, R., "Event MIB," Network Working Group, RFC 2981, Oct. 2000, 49 pages.
McCloghrie, K. et al., "The Interfaces Group MIB," Network Working Group, RFC 2863, Jun. 2000, 62 pages.
McCloghrie, K. et al., "Management Information Base for Network Management of TCP/IP-Based Internets," Network Working Group, RFC 1213, Mar. 1991, 63 pages.
Schulzrinne, H. et al., "RTP Payload for DTMF Digits, Telephony Tones and Telephony Signals," Network Working Group, RFC 2833, May 2000, 27 pages.
Waldbusser, S., "Remote Network Monitoring Management Information Base," Network Working Group, RFC 2819, May 2000, 88 pages.

* cited by examiner

*Primary Examiner* — Duyen M Doan
(74) *Attorney, Agent, or Firm* — Hickman Palermo Truong & Becker LLP (57) ABSTRACT

A method of persisting SNMP (Simple Network Management Protocol) variable values associated with SNMP object IDs for an SNMP managed network element across network element reloads comprises implementing a generic persist operation at the network element; and defining, in conjunction with the generic persist operation, at least one object ID for which a value is to be persisted.

30 Claims, 4 Drawing Sheets

METHOD AND APPARATUS FOR PERSISTING SNMP VARIABLE VALUES

FIELD OF THE INVENTION

The present invention generally relates to network management. The invention relates more specifically to a method and apparatus for persisting SNMP MIB variable values across network element reloads.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A known network management approach comprises simple network management protocol (SNMP) which allows exchange of management information between network devices. SNMP is described, for example, in "A Simple Network Management Protocol (SNMP)" which is available at the time of writing on the file "rfc1157.html" and subsequent Requests for Comments (RFC) in the directory "rfc" of the domain "ietf.org" of the World Wide Web. SNMP is well understood by the skilled reader and so is described only in summary here with reference to FIG. 1 which is a block diagram showing a network using SNMP. A network management system (NMS) 100 comprises a network computer device on which is resident a management application 102 which communicates via a network 104 with one or more managed network elements 106 for example a router, switch, host or other managed network device. In particular, the management application 102 receives operational, status, statistical and other information from and relating to the network element 106, which information is obtained by an SNMP agent 108 on the network element 106 which stores the information as a management information base (MIB) 110.

Figure 1:
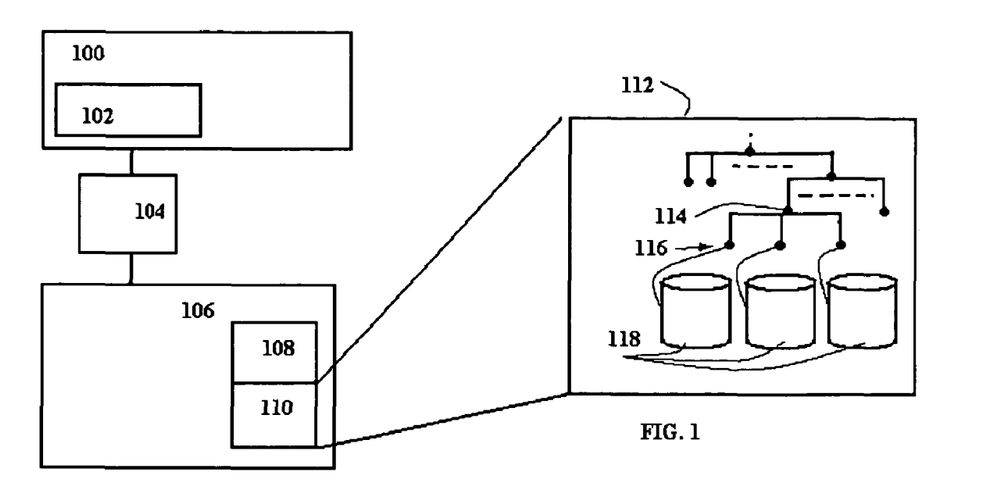
FIG. 1 is a representation of a network using SNMP.

MIBs are well understood by the skilled reader and described, for example, in "Management Information Base for Network Management of TCP/IP-based-internet: MIB-II" which is available at the time of writing on the file "rfc1213.txt" in the directory "rfc" of the domain "ietf.org" of the World Wide Web. In particular the information is ordered by treating it as objects each having an object identifier (OID) stored in a hierarchy 112. The OIDs are represented in a tree structure, each point on the tree either terminating at a branch 114 or at a leaf node 116 pointing to a variable value 118 for the object. The OID is expressed in the form .x.y.z . . . signifying the route to the respective node from the root of the tree. The information objects can take any appropriate form for example configuration information, interface information, event information, alarm information and so forth and may take either a scalar or a table value.

The MIB is populated according to a scheme or process managed by the SNMP agent 108. However when the network element 106 reloads, for example upon a reboot, some values must be obtained again and reloaded into the MIB. As a result, extra coding and complexity are required by the network management system.

An example of this arises in the case of the information object type "ifIndex" value assigned to identify an interface. The MIB in this case is "The Interfaces Group MIB" which is available at the time of writing on the file "rfc2863.txt" in the directory "rfc" of the domain "ietf.org" of the World Wide Web. This specifies:

```
ifIndex OBJECT-TYPE
SYNTAX   InterfaceIndex
MAX-ACCESS read-only
STATUS   current
DESCRIPTION
```

"A unique value, greater than zero, for each interface. It is recommended that values are assigned contiguously starting from 1. The value for each interface sub-layer must remain constant at least from one re-initialization of the entity's network management system to the next re-initialization."

```
::= { ifEntry 1 }
```

In view of the possibility of re-initialisation of ifIndex, an ifIndex persistence feature has been implemented as described in "Configuring SNMP ifIndex Persistence" which is available at the time of writing on the file "ifIndex.htm" in the directory "univercd/cc/td/doc/product/lan/cat6000/122sx/swcg" of the domain "cisco.com" of the World Wide Web. In particular a command is entered, for example on the command line interface (CLI) of type:
router (config)# snmp-server ifIndex persist. Accordingly, known solutions only provide SNMP MIB variable persistence for specific features requiring individual and potentially specifically tailored command input per-feature.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for persisting network management SNMP MIB variables is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Structural and Functional Overview
 3.0 Method of persisting SNMP MIB variable values
 4.0 Implementation Mechanisms-Hardware Overview
 5.0 Extensions and Alternatives

1.0 General Overview

The needs identified in the foregoing Background, and other needs and objects that will become apparent for the following description, are achieved in the present invention, which comprises, in one aspect, a method of persisting SNMP (Simple Network Management Protocol) variable values associated with SNMP object IDs for an SNMP managed network element across network element reloads. The method comprises implementing a generic persist operation at the network element; and defining, in conjunction with the generic persist operation, at least one object ID for which a value is to be persisted.

In other aspects, the invention encompasses a computer apparatus and a computer-readable medium configured to carry out the foregoing steps.

2.0 Structural and Functional Overview

In overview a generic persist operation for example as a command in the CLI or implemented as an MID allows specification of any SNMP object such as an MIB object for which the variable value is to be persisted. The persisted value is written to non-volatile memory such as NVRAM (non volatile RAM). As a result, upon reload of the managed network element, for example the network device 106, persisted MIB object variables are identified, obtained from NVRAM and loaded as MIB object variable values.

In addition, tables or related sets of objects can be persisted by wild carding an object OID such that all child objects are persisted together with the wildcarded parent. As a result, a generic mechanism is provided for saving SNMP MIB variables across reloads which can provide assistance in the domain of fault, configuration, accounting, performance, security and troubleshooting in relation to a specific object OID or groups of SNMP OIDs from any SNMP managed network elements, servers or applications. The method thus allows persistence across a reload of any specific SNMP object OID or any grouping of SNMP OID where the parent OID and a wild card are specified allowing persistence of all SNMP OIDs whose parent is the specified OID. The technique can be applied to any SNMP managed network elements such as, a router, switch or hub and any SNMP managed network station or application.

3.0 Method of Persisting SNMP MIB Variable Values

Figure 2:
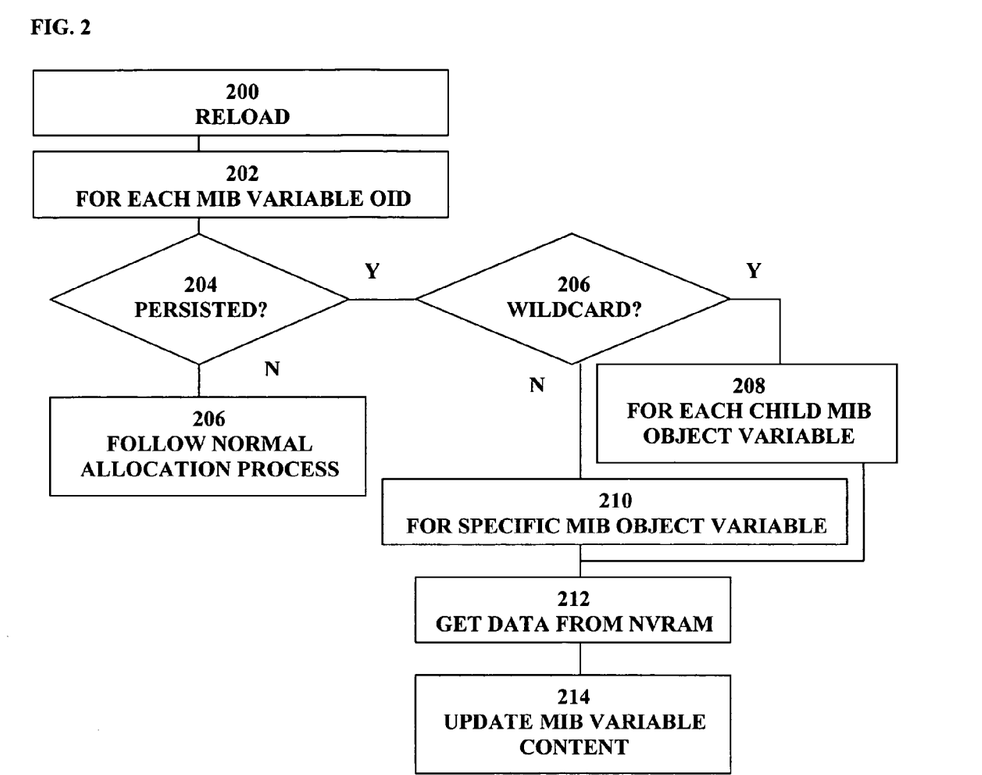
FIG. 2 is a flow diagram illustrating a method for persisting network management SNMP MIB variable values.

A method for persisting SNMP MIB variable values can be further understood with reference to FIG. 2 which is a flow diagram illustrating steps involved in implementing the method. At step 200 a managed network element such as network device 106 in FIG. 1 is rebooted. At step 202 the management agent cycles through a procedure for each MIB variable OID to check whether, at step 204 the variable is persisted. As discussed in more detail below this can be established, for example, from the start up configuration on the network device. The start up configuration may, for example identify specifically which OIDs are persisted, or OIDs which are persisted may carry an appropriate flag.

For non-persisted MIB variables at step 206 the management agent follows the normal allocation process for values to MIB variable OIDs, as appropriate at the specific network device and SNMP agent.

However, if the variable OID is persisted then in step 206 it is identified whether the OID is specified as a "wild card" as indicated by the appropriate command. If the persisted variable is specified as a wild card then this signifies that all child SNMP OIDs in the MIB tree together with the specified OID itself are persisted at step 208. Otherwise, at step 210 the appropriate measures are carried out only for the specific MIB object variable.

In either case, at step 212 the persisted variable data is obtained for the MIB variable value saved. For example the persisted data may have been stored in NVRAM (non volatile random access memory) or any other appropriate non-volatile memory storage as described in more detail below. Then, at step 214 the MIB variable content is updated.

Figure 3:
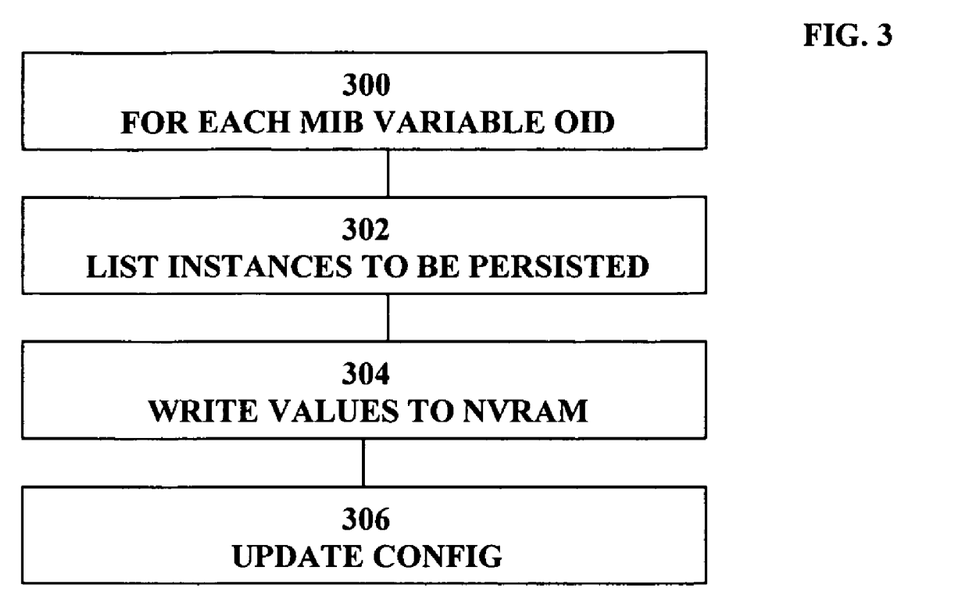
FIG. 3 is a flow diagram illustrating a further aspect of a method of persisting SNMP MIB variable values.

The specific way in which the MIB variables for which the persist operation is configured can be identified include, for example, via the CLI or via an MIB, and is described with reference to FIG. 3 which is a flow diagram showing the configuration of the operation. At step 300, the instances or groups/tables to be persisted are identified and listed at step 302 including any wild cards and defined by appropriate commands. For example commands of the type "SNMP MIB persist instance exact OID" allows persistence of a specific OID whereas "SNMP MIB persist instance wild ODD" ensures persistence of all child MIB variables of that OID.

At step 304 the variable values for the instance or group are written to non-volatile memory, for example NVRAM and at step 306 appropriate steps are taken to ensure that the object variables are recognized as persist or wild card persist features upon reboot for example by updating the start up configuration as appropriate. It will be seen, therefore, any features can be specified for persistence either individually or as groups rather than each instance being specifically coded. In addition, as values are updated during operation the revised values can be written to NVRAM for persisted variables such that, should the network device require reload, the most recent updated value is retrieved and persisted.

As an example of the generic persist operation in the form of a CLI command a sample set of features can be persisted generically following the instructions:

```
snmp mib persist
    add instance exact ifTableLastChange
    add instance exact ifName.2
    add instance exact ifMtu.2
    add instance exact ifSpeed.2
    add instance exact ifInOctets.2
    add instance interface 2 exact ifInOctets
    add instance wild alarmTable
    add instance wild eventTable
    add instance exact ifIndex.5
```

It will be seen that various specific objects are persisted for example ifTableLastChange, ifName, ifMTU and so forth. In addition various groups of objects are persisted using wildcards including alarmTable and eventTable which store information tables concerning predetermined occurrences at the network device.

It will be noted that the exact system of the command can be altered as appropriate. For example, two alternative commands are presented in relation to ifInOctets: "add instance exact ifInOctets.2" and "add instance interface <interface-id> exact ifInOctets" which in practice will produce the same result. In addition, commands can be implemented that will persist, for example, all MIB variables related to a given interface index. For example ifIndex equals 2, related MIB variables can be persisted using the command: add instance interface <interface-id> wild ifTable.

Persist commands can be removed if required. For example the final instance set out above can be de-persisted using a command "remove instance exact ifIndex.5".

In some instances it is necessary to ensure that variables are persisted in an appropriate manner. For example SNMP counters can be persisted on the condition that their values are updated often enough such that there is not a large gap in continuity. Related MIB variables should of course be persisted together. For example even if objects such as ifInOctets.2 is categorized as "must persist" by the startup configuration, the ifInOctets.2 can only be assigned should if the ifIndex.2 value was persisted. In the event that a persisted element is no longer obtainable, for example it cannot be located upon restart, then an appropriate event can be logged. Of course where elements must not be persisted then they should not be entered as part of the persist operation.

Although the example provided above is configured on the CLI it will be appreciated that, alternatively, generic persistence may be configured using an MIB. In that case the MIB would store the instances to be persisted following a similar structure to that of the CLI provided above allowing individual or group instances to be persisted. For example, where MIB variables are configured via the CLI, the MIB entries are automatically updated such that any change to the CLI, invokes a corresponding change to the MIB. Where configuration is achieved via the MIB the converse applies and, the CLI changes.

The simplified SNMP MIB persistence configuration described herein is advantageous in domains such as fault, configuration, accounting, performance and security. For example accounting can be continued even after a network element reload, quicker network/device discovery is enabled and ease of operation is provided in the case of required re-configuration.

The approach can be applied in any network management system, for example any SNMP-managed network element or NMS application. The skilled person will be aware that simple software changes can be implemented to put the invention into effect such that further detailed discussion is not required here.

4.0 Implementation Mechanisms—Hardware Overview

Figure 4:
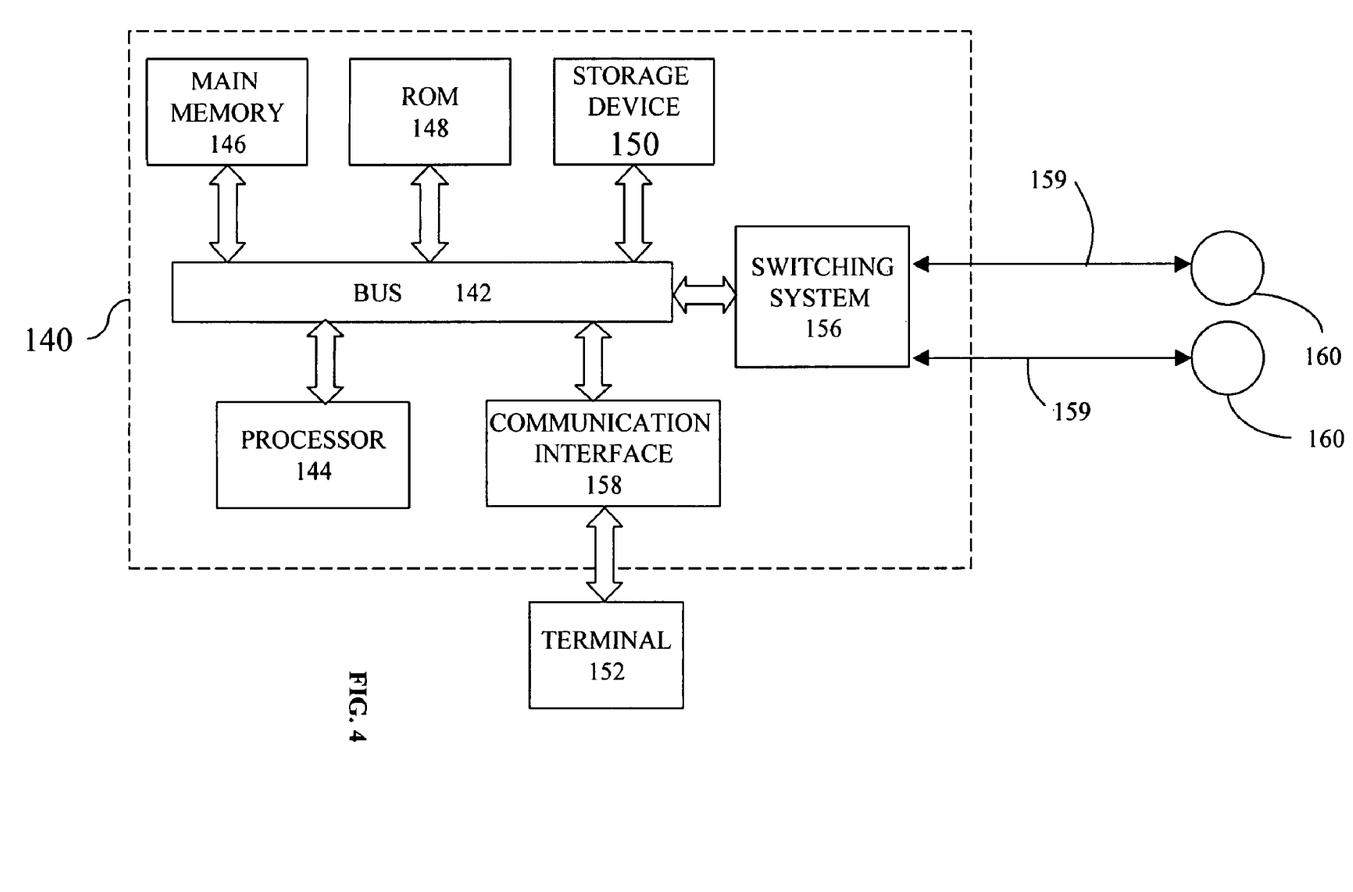
FIG. 4 is a block diagram that illustrates a computer system upon which a method for persisting SNMP MIB variable values may be implemented.

FIG. 4 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as network element the above described method. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile-media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions.

The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The method steps set out can be carried out in any appropriate order and aspects from the examples and embodiments described juxtaposed or interchanged as appropriate.

The method described may be implemented in relation to any appropriate network management protocol or system and any MIB structure. It may be applied in relation to management of any appropriate network device and in relation to any appropriate MIB object value.

What is claimed is:

1. A method of persisting SNMP (Simple Network Management Protocol) variable values associated with SNMP object IDs for an SNMP managed network element comprising:
   a network element implementing a generic persist operation;
   wherein implementing the generic persist operation comprises:
   defining, through one or more user-specified commands in conjunction with the generic persist operation, at least one object ID for which a value is to be persisted;
   based on the one or more user-specified commands, determining that persistent storage should occur for values of at least one object ID;
   based on the presence of a wild card in said one or more user-specified commands, determining that persistent storage should occur for values of all child objects of a set of child objects hierarchically depending from the at least one object ID;
   storing the values of the at least one object ID into non-volatile storage located within the network element, wherein the SNMP object comprises a group object instance and the SNMP objects are represented using a hierarchical structure and the group object instance comprises a first SNMP object and all SNMP objects hierarchically depending from said first SNMP object.

2. A method as claimed in claim 1 in which the SNMP object comprises a management information base (MIB) object and the value comprises an MIB object variable value.

3. A method as claimed in claim 1 in which the SNMP object comprises a specific object instance.

4. A method as claimed in claim 1 in which the SNMP object comprises a group object instance.

5. A method as claimed in claim 4 in which the SNMP objects are represented using a hierarchical structure and the group instance comprises a first SNMP objects and all SNMP objects that hierarchically depend from said first SNMP object.

6. A method as claimed in claim 1 in which the persist operation is configured via the command line interface (CLI) to the network element.

7. A method as claimed in claim 1 in which the persist operation is configured via a further SNMP object.

8. A method as claimed in claim 1 further comprising, upon reload of a managed network element, identifying SNMP objects for which SNMP object values are to be persisted and retrieving the persisted values from non-volatile storage.

9. A non-transitory computer readable storage medium comprising one or more sequences of instructions for persisting SNMP MIB variable values associated with SNMP object IDs for an SNMP managed network element which, when executed by one or more processors, cause the one or more processors to perform:
   implementing a generic persist operation; wherein implementing the generic persist operation comprises:
   defining, through one or more user-specified commands in conjunction with the generic persist operation, at least one object ID for which a value is to be persisted;
   based on the one or more user-specified commands, determining that persistent storage should occur for values of at least one object ID;
   based on the presence of a wild card in said one or more user-specified commands, determining that persistent storage should occur for values of all child objects of a set of child objects hierarchically depending from the at least one object ID;
   storing the values of the at least one object ID into non-volatile storage located within the network element, wherein the SNMP object comprises a group object instance and the SNMP objects are represented using a hierarchical structure and the group object instance comprises a first SNMP object and all SNMP objects hierarchically depending from said first SNMP object.

10. An apparatus for persisting SNMP variable values associated with SNMP objects IDs for SNMP managed network element across network element reloads comprising:
   a network element;
   means for implementing a generic persist operation at the network element;
   means for defining, through one or more user-specified commands in conjunction with the generic persist operation, at least one object ID for which a value is to be persisted;
   means for determining based on the one or more user-specified commands,
   that persistent storage should occur for values of at least one object ID;
   means for determining based on the presence of a wild card in said one or more user-specified commands, that persistent storage should occur for values of all child objects of a set of child objects hierarchically depending from the at least one object ID;
   means for storing the values of the at least one object ID into non-volatile storage located within the network element, wherein the SNMP object comprises a group object instance and the SNMP objects are represented using a hierarchical structure and the group object instance comprises a first SNMP object and all SNMP objects hierarchically depending from said first SNMP object.

11. An apparatus for persisting SNMP variable values, the apparatus comprising:
   one or more processors; and
   a non-transitory computer readable medium comprising one or more sequences of instructions for persisting SNMP variables values which, when executed by the one or more processors, cause the one or more processors to perform:
   implementing a generic persist operation;
   defining, through one or more user-specified commands in conjunction with the generic persist operation, at least one object ID for which a value is to be persisted; based on the one or more user-specified commands, determining that persistent storage should occur for values of at least one object ID;
   based on the presence of a wild card in said one or more user-specified commands, determining that persistent storage should occur for values of all child objects of a set of child objects hierarchically depending from the at least one object ID; storing the values of the at least one object ID into non-volatile storage located within the network element, wherein the SNMP object comprises a group object instance and the SNMP objects are represented using a hierarchical structure and the group object instance comprises a first SNMP object and all SNMP objects hierarchically depending from said first SNMP object.

12. A non-transitory computer readable storage medium as claimed in claim 9 in which the SNMP object comprises a management information base (MIB) object and the value comprises an MIB object variable value.

13. A non-transitory computer readable storage medium as claimed in claim 9 in which the SNMP object comprises a specific object instance.

14. A non-transitory computer readable storage medium as claimed in claim 9 in which the SNMP object comprises a group object instance.

15. A non-transitory computer readable storage medium as claimed in claim 14 in which:

the SNMP objects are represented using a hierarchical structure, and the group instance comprises a first SNMP object and all SNMP objects that hierarchically depend from said first SNMP object.

16. A non-transitory computer readable storage medium as claimed in claim 9 in which the persist operation is configured via the command line interface (CLI) to the network element.

17. A non-transitory computer readable storage medium as claimed in claim 9 in which the persist operation is configured via a further SNMP object.

18. A non-transitory computer readable storage medium as claimed in claim 9 further comprising, upon reload of a managed network element, identifying SNMP objects for which SNMP object values are to be persisted and retrieving the persisted values from non-volatile storage.

19. A method of persisting SNMP (Simple Network Management Protocol) variable values associated with SNMP object IDs for an SNMP managed network element comprising:
   receiving one or more user-specified commands;
   determining that persistent storage should occur for values of at least one object ID in the one or more user-specified commands;
   determining, based on a wild card in the one or more user-specified commands, that persistent storage should occur for values of all child objects of a set of child objects that hierarchically depend from the at least one object ID;
   storing the values of the at least one object ID in non-volatile storage, wherein the SNMP object comprises a group object instance and the SNMP objects are represented using a hierarchical structure, and the group object instance comprises a first SNMP object and all SNMP objects that hierarchically depend from the first SNMP object.

20. A method as claimed in claim 19 in which the SNMP object comprises a management information base (MIB) object and the value comprises an MIB object variable value.

21. A method as in claim 19, further comprising:
   the SNMP managed network element implementing a generic persist operation;
   wherein implementing the generic persist operation comprises:
   defining, through one or more user-specified commands in conjunction with the generic persist operation, at least one object ID for which a value is to be persisted.

22. A method as claimed in claim 21 in which the generic persist operation is configured via the command line interface (CLI) to the network element.

23. A method as claimed in claim 19 in which the generic persist operation is configured via a further SNMP object.

24. A method as claimed in claim 1, further comprising:
   upon reload of a managed network element, identifying SNMP objects for which SNMP object values are to be persisted;
   and retrieving the persisted values from non-volatile storage.

25. A non-transitory computer readable storage medium comprising one or more sequences of instructions for persisting SNMP MIB variable values associated with SNMP object IDs for an SNMP managed network element which, when executed by one or more processors, cause the one or more processors to perform:
   receiving one or more user-specified commands;
   determining that persistent storage should occur for values of at least one object ID in the one or more user-specified commands;

determining, based on a wild card in the one or more user-specified commands, that persistent storage should occur for values of all child objects of a set of child objects that hierarchically depend from the at least one object ID;

storing the values of the at least one object ID in non-volatile storage, wherein the SNMP object comprises a group object instance and the SNMP objects are represented using a hierarchical structure, and the group object instance comprises a first SNMP object and all SNMP objects that hierarchically depend from the first SNMP object.

26. A non-transitory computer readable storage medium as claimed in claim 25 in which the SNMP object comprises a management information base (MIB) object and the value comprises an MIB object variable value.

27. A non-transitory computer readable storage medium as in claim 25, further comprising:
the SNMP managed network element implementing a generic persist operation;

wherein implementing the generic persist operation comprises:
defining, through one or more user-specified commands in conjunction with the generic persist operation, at least one object ID for which a value is to be persisted.

28. A non-transitory computer readable storage medium as claimed in claim 27 in which the generic persist operation is configured via the command line interface (CLI) to the network element.

29. A non-transitory computer readable storage medium as claimed in claim 25 in which the generic persist operation is configured via a further SNMP object.

30. A non-transitory computer readable storage medium as claimed in claim 1, further comprising:
upon reload of a managed network element, identifying SNMP objects for which SNMP object values are to be persisted;
and retrieving the persisted values from non-volatile storage.

* * * * *